W. D. WRIGHT.
CAR FENDER.
APPLICATION FILED MAY 12, 1913.
1,111,346.
Patented Sept. 22, 1914.
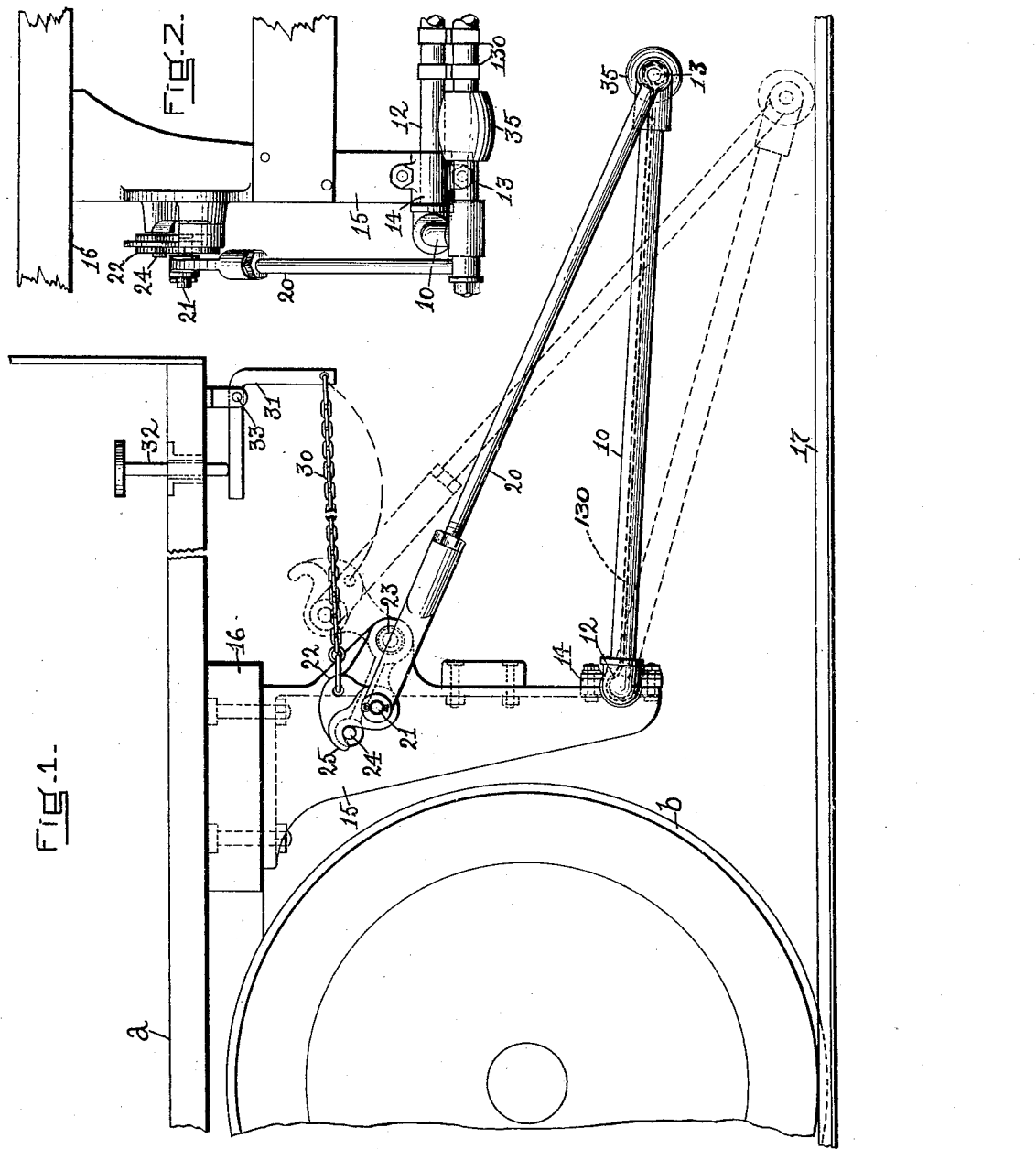

UNITED STATES PATENT OFFICE.

WILLIAM D. WRIGHT, OF PROVIDENCE, RHODE ISLAND.

CAR-FENDER.

1,111,346. Specification of Letters Patent. Patented Sept. 22, 1914.

Application filed May 12, 1913. Serial No. 767,081.

*To all whom it may concern:*

Be it known that I, WILLIAM D. WRIGHT, a citizen of the United States, residing in Providence, in the county of Providence and State of Rhode Island, have invented an Improvement in Car-Fenders, of which the following description, in connection with the accompanying drawings, is a specification, like characters on the drawings representing like parts.

This invention relates to a car fender, especially designed and adapted for use on surface electric railway cars, and more particularly as a wheel guard.

The present invention has for its object to provide a simple, efficient, light and inexpensive construction of fender, which is automatically locked in its elevated position by lifting its outer or front end, and which is held in its locked position, as will be described, against pressure which may be applied to its outer or front end.

The particular features of this invention will be pointed out in the claims at the end of this specification.

Figure 1 is a side elevation of a car fender embodying this invention, and Fig. 2, a front elevation of one side of the fender shown in Fig. 1 the tripping mechanism shown in Fig. 1 being omitted.

Referring to the drawing, $a$ represents the body of an electric railway car of any suitable or usual construction, such as now commonly used on surface railways, and $b$ represents one of the front wheels thereof. The car $a$ is provided with a wheel guard or fender, which is located below the body $a$ of the car in close proximity to the wheels $b$, and comprises a movable member or fender proper, designed to support the body of a person who may get below the car body.

The fender proper may be of any suitable construction and as herein shown, consists of a frame composed of substantially parallel side rods or bars 10, only one of which is shown, which are connected by cross rods or bars 12, 13, and straps 130 connecting said cross rods. The cross rod 12 constitutes a pivot for the fender proper and is mounted to turn in bearings 14 secured to a support, shown as hangers or brackets 15, depending from a cross bar 16 attached to the underside of the car body. Only one end of the fender is shown, as that is sufficient for a full understanding of the invention.

The front end of the fender proper is designed to be elevated above the rails of the track 17, a sufficient distance to clear stones or other like devices on the car track, and is held in its elevated position by mechanism as will now be described. To this end, the fender proper has pivotally connected to each end of the front cross bar or rod 13, a link 20, which has its upper end pivotally connected at 21 to a lever 22 between the ends of the latter, which lever is pivoted at 23 to the hanger or bracket 15 and has its free end adapted to be engaged with a stop, which is shown as a pin 24 extended from the side of the hanger 15, and the free end of the lever 22 is shown in the present instance as provided with a hook 25, which engages said pin. The pin 24, the pivot 23, and the cross bar 13 are arranged in substantially a straight line when the fender proper is in its elevated position, shown by full lines in Fig. 1, and the pivotal connection between the upper end of the link 20 and the lever 22, which is shown as the pin 21 on the said lever, is below or off the center line between the pivot 23 and the stop 24, consequently the fender proper is locked in its elevated position.

Any pressure placed upon the front end of the movable member of the fender acts to keep the pin 21 below the center line and thereby acts to keep the fender proper in its locked position. The fender proper may be released from its locked position by turning the lever 22 on its pivot 23, so as to move the pin 21 to the opposite side of the center line through the pivot 23 and stop 24, and as soon as the pin 21 has passed the center line, the fender drops by gravity into its operative or lowered position represented by dotted lines in Fig. 1. The movement of the lever 22 so as to carry the pin 21 past or above the center line referred to, may be effected by pulling upon a chain or cord 30, attached to each lever 22, and in the present instance connected to a lever 31, engaged by a rod 32 extended up through the car platform and accessible to the motorman, who can depress the same with his foot and cause the lever 31 to be turned so as to draw or pull upon the chains 30 and thus move the levers 22 to trip or release the fender proper and permit it to drop in to its operative position with its front cross bar 13 in close proximity to the car tracks. The front cross bar 13 may be provided with rollers 35 to facilitate forward movement of the fender in its lowered position. If desired the chain or cords 30 may be connected with the pilot bar or gate (not shown) but which is now employed with some classes of fenders, and when so used, the swinging of the gate or pilot bar will draw or pull upon the chains 30 to release the fender proper in the same manner as above described.

After the fender proper has been lowered, it can be restored to its inoperative position by the conductor or other operator raising its front end until each lever 22 engages its stop 24, that is, the fender proper is automatically locked in its inoperative position by merely lifting the front end of the same until each lever 22 engages the stop 24.

The movable member of the fender may be of any suitable or desired construction.

Claims.

1. In a fender for railway cars, in combination, a fender proper, a support to which said fender is pivoted, means for supporting and locking said fender proper in its elevated position comprising a link pivotally connected to the fender proper, a lever pivoted to said support and to which said link is pivotally connected, a stop with which the free end of said lever coöperates, said stop and pivot for said lever being substantially in a center line with the pivotal connection of said link and fender proper in the elevated position of the latter, and the pivotal connection of the upper end of said link with the said lever being at one side of the said center line through the said stop and pivot for said lever, substantially as described.

2. In a fender for railway cars, in combination, a fender proper, a support to which said fender proper is pivoted, a link pivotally connected at its lower end with said fender proper, a lever to which the upper end of said link is pivotally connected, a support to which said lever is pivoted, a stop with which the free end of the lever coöperates and engages with the fender proper in its elevated position, the pivotal connection of said link with the said lever being below a center line through the stop and the pivot for the lever when the lever engages said stop, substantially as described.

3. In a fender for railway cars, in combination, a fender proper, a support to which said fender proper is pivoted, a rigid link pivotally connected at its lower end with said fender proper, a lever pivoted at one end and provided with a hook at its free end, and to which the upper end of said rigid link is pivotally connected at one side of a center line through said hook and the pivot for said lever, and a stop with which said hook coöperates, substantially as described.

4. In a fender for railway cars, in combination, a fender proper, a support to which said fender proper is pivoted, a pivoted lever, a stop with which the free end of said lever coöperates, and rigid means connecting the fender proper with said lever at a point between said pivot and stop and at one side of a center line through said stop and the pivot for said lever, substantially as described.

In testimony whereof, I have signed my name to this specification in the presence of two subscribing witnesses.

WILLIAM D. WRIGHT.

Witnesses:
CLARENCE E. BURLINGHAM,
IRENE D. CRANE.

Copies of this patent may be obtained for five cents each, by addressing the "Commissioner of Patents, Washington, D. C."